US012711758B2

(12) United States Patent
Chen et al.

(10) Patent No.: US 12,711,758 B2
(45) Date of Patent: Aug. 18, 2026

(54) RUNTIME RANKING OF OBJECT DETECTION

(71) Applicant: Microsoft Technology Licensing, LLC, Redmond, WA (US)

(72) Inventors: Dongdong Chen, Redmond, WA (US); Yunsheng Li, Sammamish, WA (US); Lu Yuan, Redmond, WA (US); Xuelu Feng, Buffalo, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 18/431,913

(22) Filed: Feb. 2, 2024

(65) Prior Publication Data

US 2025/0252731 A1 Aug. 7, 2025

(51) Int. Cl.
*G06V 10/771* (2022.01)
*G06V 10/98* (2022.01)

(52) U.S. Cl.
CPC .......... *G06V 10/993* (2022.01); *G06V 10/771* (2022.01)

(58) Field of Classification Search
CPC ... G06V 10/993; G06V 10/421; G06V 10/771
USPC ........................................ 382/156, 173, 190
See application file for complete search history.

(56) References Cited

U.S. PATENT DOCUMENTS

2021/0027471 A1* 1/2021 Cohen .................. G06N 3/0442
2022/0020156 A1* 1/2022 Mohammad ............. G06T 7/11
2022/0253639 A1 8/2022 Fan
2022/0292684 A1 9/2022 Wang
2023/0206456 A1* 6/2023 Lee ...................... G06V 10/764 382/266
2023/0298184 A1 9/2023 Taruttis
2024/0112088 A1 4/2024 Yu
2024/0168617 A1 5/2024 Lin
2024/0249414 A1 7/2024 Morard
(Continued)

FOREIGN PATENT DOCUMENTS

CN 116229104 A 6/2023
CN 116452793 A 7/2023

OTHER PUBLICATIONS

Extended European search report received for European Application No. 25153921.9, mailed on Jun. 5, 2025, 10 Pages.

(Continued)

*Primary Examiner* — Jamares Q Washington
(74) *Attorney, Agent, or Firm* — Foley IP Law, PLLC

(57) ABSTRACT

Example solutions for ranking object detection results generate or receive a plurality of segmentation masks each corresponding to one or more images. Each segmentation mask of each plurality of segmentation masks is generated using a different object detector or setting options. A quality predictor assigns a quality score to each segmentation mask, without using ground truth for the image(s). A set (one or more, but less than all) of the highest quality scores is identified for each image. In some examples, an image processing task is performed using the segmentation masks having an assigned quality score that is within the set of highest quality scores. In some examples, only the segmentation mask having the highest quality score for an image is used in the image processing task. In some examples, a quality threshold is provided, and the segmentation masks meeting the quality threshold are used in the image processing task.

18 Claims, 9 Drawing Sheets

(56) References Cited

U.S. PATENT DOCUMENTS

| | | | |
|---|---|---|---|
| 2024/0303984 | A1 | 9/2024 | Sanchez-Matilla |
| 2025/0005924 | A1 | 1/2025 | Piergiovanni |

OTHER PUBLICATIONS

Kirillov, et al., "Segment Anything", arXiv:2304.02643v1, Apr. 5, 2023, 30 Pages.

Li, et al., "Boosting Low-Data Instance Segmentation by Unsupervised Pre-training with Saliency Prompt", IEEE/CVF Conference on Computer Vision and Pattern Recognition (CVPR), Jun. 17, 2023, pp. 15485-15494.

Liang, et al., "Visual Exemplar Driven Task-Prompting for Unified Perception in Autonomous Driving", IEEE/CVF Conference on Computer Vision and Pattern Recognition, Jun. 17, 2023, pp. 9611-9621.

Zhou et al., "Text Promotable Surgical Instrument Segmentation with Vision-Language Models", arxiv.org, Cornell University Library, Nov. 2023, 20 Pages.

Borji, et al., "Salient object detection: A survey", Springer, vol. 6, No. 2, Jun. 21, 2019, pp. 117-150.

Wu, et al., "Synthetic Data Supervised Salient Object Detection", Arxiv Cornell University, Oct. 25, 2022, 9 pages.

Xia, et al., "What is and What is Not a Salient Object? Learning Salient Object Detector by Ensembling Linear Exemplar Regressors", IEEE Conference on Computer Vision and Pattern Recognition, Nov. 2017, 9 pages.

Zeng, et al., "Towards High-Resolution Salient Object Detection", Computer Vision Foundation, Aug. 20, 2019, 10 pages.

Non-Final Office Action mailed on Jan. 14, 2026, in U.S. Appl. No. 18/431,912, 21 pages.

Final office Action mailed on May 1, 2026, in U.S. Appl. No. 18/431,912, 26 pages.

* cited by examiner

100
PRODUCTION ENVIRONMENT 102
IMAGES 104
IMAGE 104a
OBJECT 106a
IMAGE 104b
OBJECT 106b
OBJECT DETECTOR 110a
SETTINGS 112b
OBJECT DETECTOR 110b
SETTINGS 112b
OBJECT DETECTOR 110c
SETTINGS 112c
SEGMENTATION MASKS 120
QUALITY PREDICTOR 400
QUALITY SCORES 410
STORAGE 130
QUALITY THRESHOLD 144
MASK SELECTOR 140
HIGH SCORES 420
REPORT 146
TASK 152
IMAGE PROCESSING FUNCTION 150
IMAGE PROCESSING RESULT 154

IMAGES 104
IMAGE 104a
OBJECT 106a
IMAGE 104b
OBJECT 106b
OBJECT DETECTOR 110a
SETTINGS 112b
OBJECT DETECTOR 110b
SETTINGS 112b
OBJECT DETECTOR 110c
SETTINGS 112c
SEGMENTATION MASKS 120
MASKS FOR IMAGE 104a 302
MASK (object detector 110a) 302a
MASK (object detector 110b) 302b
MASK (object detector 110c) 302c
MASKS FOR IMAGE 104b 304
MASK (object detector 110a) 304a
MASK (object detector 110b) 304b
MASK (object detector 110c) 304c
STORAGE 130
SEGMENTATION MASKS 120

400
QUALITY PREDICTOR
TRAINER 500
IMAGES 502
502b
502a
IMAGE
MASKS 504
504b
504a
MASK
SCORES 506
506b
506a
SCORE

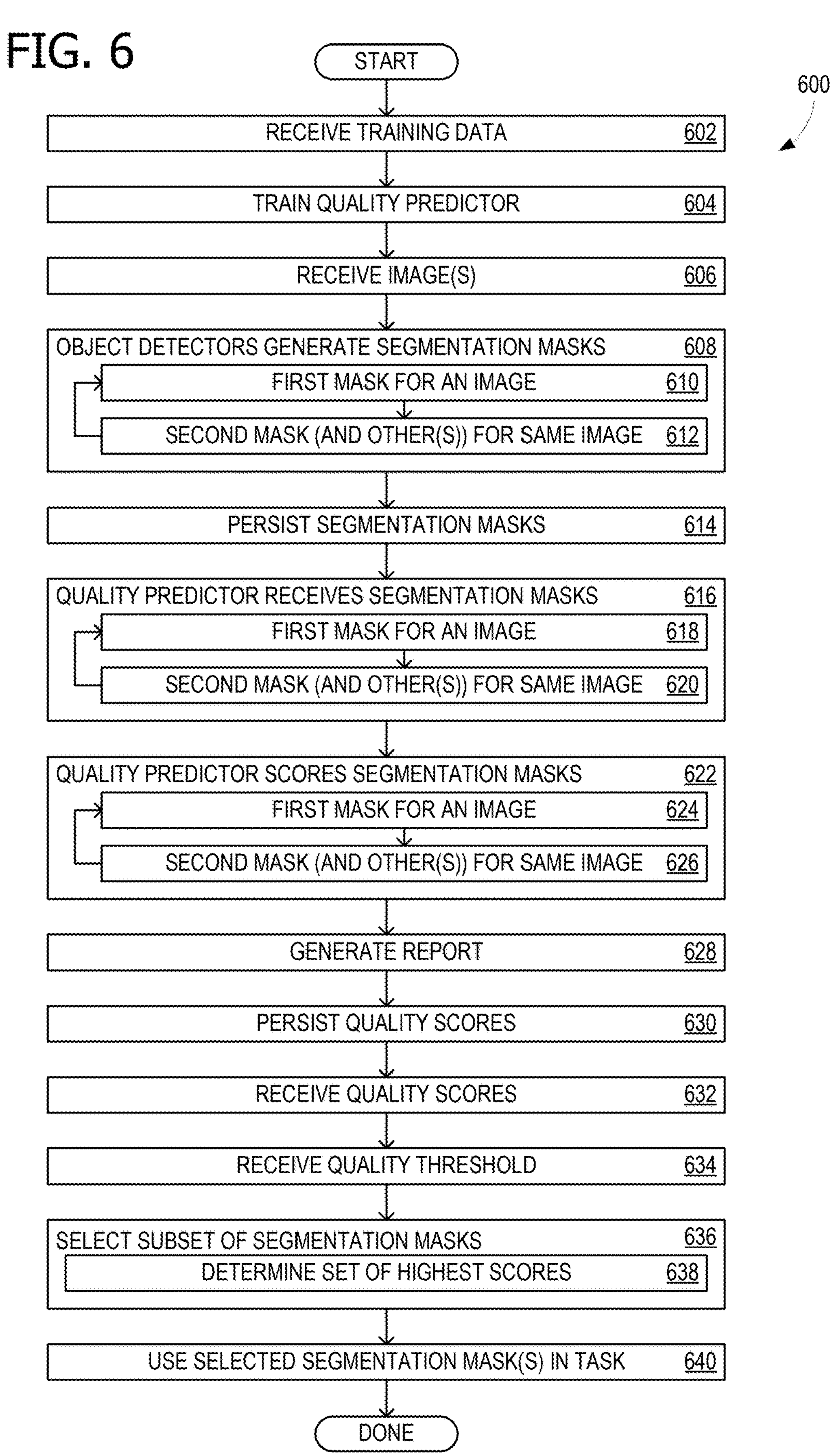
FIG. 6
START
600
RECEIVE TRAINING DATA 602
TRAIN QUALITY PREDICTOR 604
RECEIVE IMAGE(S) 606
OBJECT DETECTORS GENERATE SEGMENTATION MASKS 608
FIRST MASK FOR AN IMAGE 610
SECOND MASK (AND OTHER(S)) FOR SAME IMAGE 612
PERSIST SEGMENTATION MASKS 614
QUALITY PREDICTOR RECEIVES SEGMENTATION MASKS 616
FIRST MASK FOR AN IMAGE 618
SECOND MASK (AND OTHER(S)) FOR SAME IMAGE 620
QUALITY PREDICTOR SCORES SEGMENTATION MASKS 622
FIRST MASK FOR AN IMAGE 624
SECOND MASK (AND OTHER(S)) FOR SAME IMAGE 626
GENERATE REPORT 628
PERSIST QUALITY SCORES 630
RECEIVE QUALITY SCORES 632
RECEIVE QUALITY THRESHOLD 634
SELECT SUBSET OF SEGMENTATION MASKS 636
DETERMINE SET OF HIGHEST SCORES 638
USE SELECTED SEGMENTATION MASK(S) IN TASK 640
DONE

Figure 8:
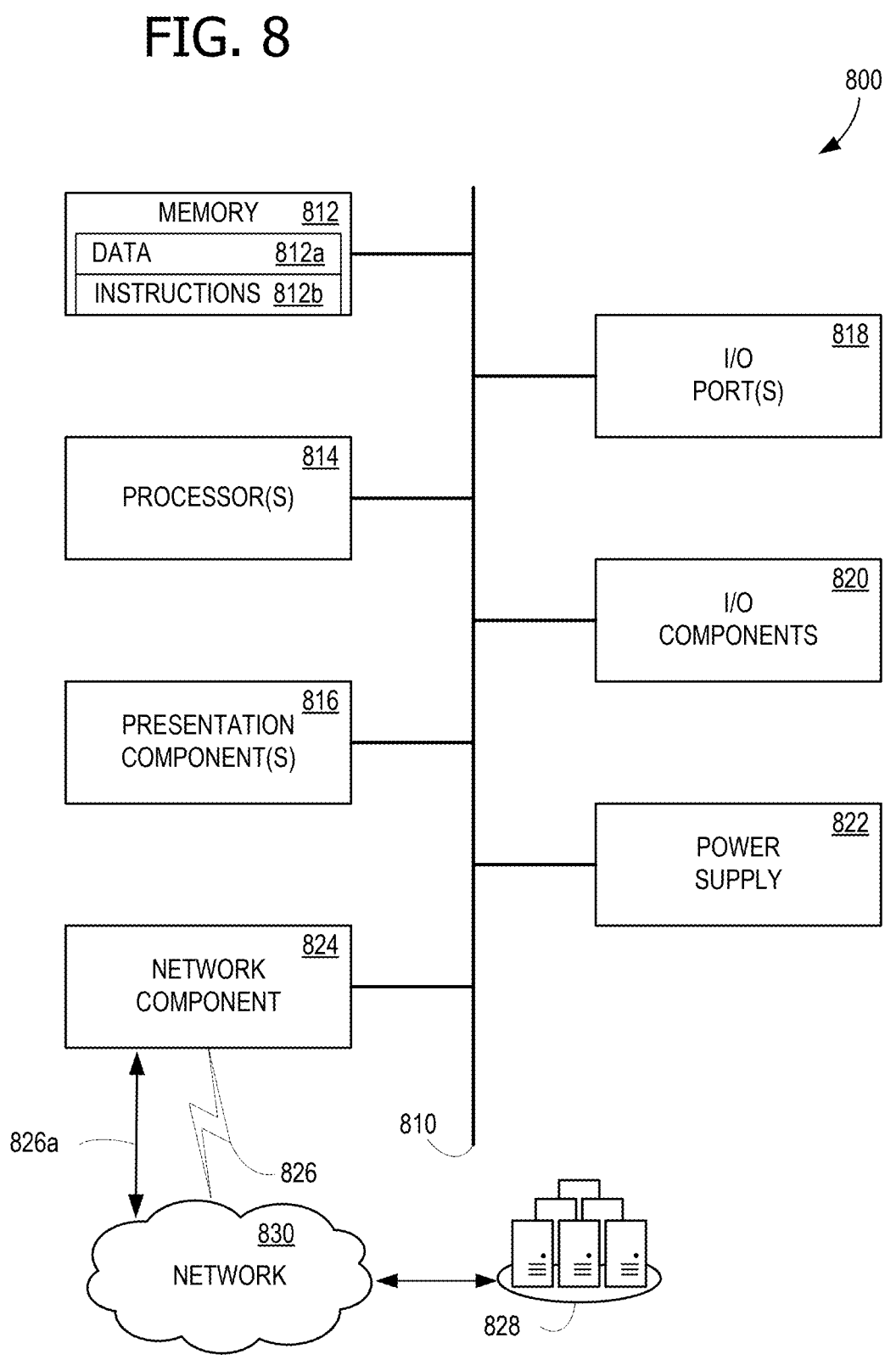

MEMORY 812
DATA 812a
INSTRUCTIONS 812b

I/O PORT(S) 818

PROCESSOR(S) 814

I/O COMPONENTS 820

PRESENTATION COMPONENT(S) 816

POWER SUPPLY 822

NETWORK COMPONENT 824

810

826a

826

NETWORK 830

828

RUNTIME RANKING OF OBJECT DETECTION

BACKGROUND

Salient object detection (SOD) is a classical machine vision task that seeks to automatically segment salient objects within a given input image. A salient object is one that draws a viewer's attention in an image. A number of different capable object detectors exist, each of which may outperform others for some set of images based on image content and characteristics (e.g., sharpness, contrast, brightness, noise, object count, object characteristics). Additionally, some object detectors may be used with different operational settings, intended to compensate for variations in image content and characteristics, that affect performance sufficiently to produce a measurable difference in the quality of output results.

Given wide range in variety of content and characteristics of images on which object detection may be performed, the number of capable object detectors, and the number of different operational settings that may significantly affect performance, it becomes infeasible for large-scale SOD projects to select the best-performing object detector, with the optimal settings, for each image in a large set of images. Because the quality of an image processing task often depends on the quality of segmentation masks used, the result is that downstream image processing tasks that rely on the results of large-scale SOD projects may produce results that are poorer quality than what would otherwise be possible.

SUMMARY

The disclosed examples are described in detail below with reference to the accompanying drawing figures listed below. The following summary is provided to illustrate some examples disclosed herein.

Example solutions for pluralistic salient object detection include: receiving a first image including an object; receiving a first segmentation mask corresponding to an object of the first image, wherein the first segmentation mask had been generated using a first object detector; receiving a second segmentation mask corresponding to the object of the first image, wherein the second segmentation mask had been generated using a second object detector different than the first object detector; assigning, by a quality predictor, a first quality score to the first segmentation mask without using ground truth for the first image; assigning, by the quality predictor, a second quality score to the second segmentation mask without using ground truth for the first image; based on at least the first quality score exceeding the second quality score, selecting the first segmentation mask for an image processing task and not selecting the second segmentation mask for the image processing task; and performing the image processing task using the first segmentation mask.

This may be generalized as: receiving a plurality of images and a plurality of segmentation masks each corresponding to an image of the plurality of images, wherein each segmentation mask of each plurality of segmentation masks had been generated using a different object detector or different object detector setting options; assigning, by the quality predictor, a quality score to each segmentation mask without using ground truth for the image(s); determining a set of highest quality scores per each image of the plurality of segmentation masks, less than all of the quality scores per each image; and performing the image processing task using segmentation masks having an assigned quality score within the set of highest quality scores.

BRIEF DESCRIPTION OF THE DRAWINGS

The disclosed examples are described in detail below with reference to the accompanying drawing figures listed below:

FIGS. 6, 7A and 7B show flowcharts illustrating exemplary operations that may be performed when using example architectures, such as the architecture of FIG. 1; and FIG. 8 shows a block diagram of an example computing device suitable for implementing some of the various examples disclosed herein.

Corresponding reference characters indicate corresponding parts throughout the drawings.

DETAILED DESCRIPTION

Example solutions for ranking object detection results generate or receive a plurality of segmentation masks each corresponding to one or more images. Each segmentation mask of each plurality of segmentation masks is generated using a different object detector or setting options. A quality predictor assigns a quality score to each segmentation mask without using ground truth for the image(s). A set (one or more, but less than all) of the highest quality scores (one or more, but less than all of the quality scores) is identified for each image. In some examples, an image processing task is performed using the segmentation masks having an assigned quality score that is within the set of highest quality scores. In some examples, only the segmentation mask having the highest quality score for an image is used in the image processing task. In some examples, a quality threshold is provided, and the segmentation masks meeting the quality threshold are used in the image processing task.

Aspects of the disclosure solve multiple problems that are necessarily rooted in computer technology and further the art of machine vision by enabling machine-based determination of object detection performance quality (where object detection is a common machine vision task). This opens the door to generation and management of large, high quality machine vision data sets, as well as improving existing large machine vision data sets, such as by identifying low quality segmentation masks and superior quality segmentation masks to use for replacement. This also improves the performance of downstream machine vision or other image processing tasks, because machine vision/image processing performance typically depends on the quality of the segmentation masks used. For example, when using the segmentation masks to edit/remove one/multiple objects within one image in the downstream system, if the mask qualities are not accurate, it will often incur editing/generation artifacts that may significantly (negatively) impact the final user experience. These advantageous results are accomplished, at least in part by a quality predictor assigning a quality score to each segmentation mask without using ground truth. A set of highest quality scores per each image is determined and used for performing an image processing task.

Various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
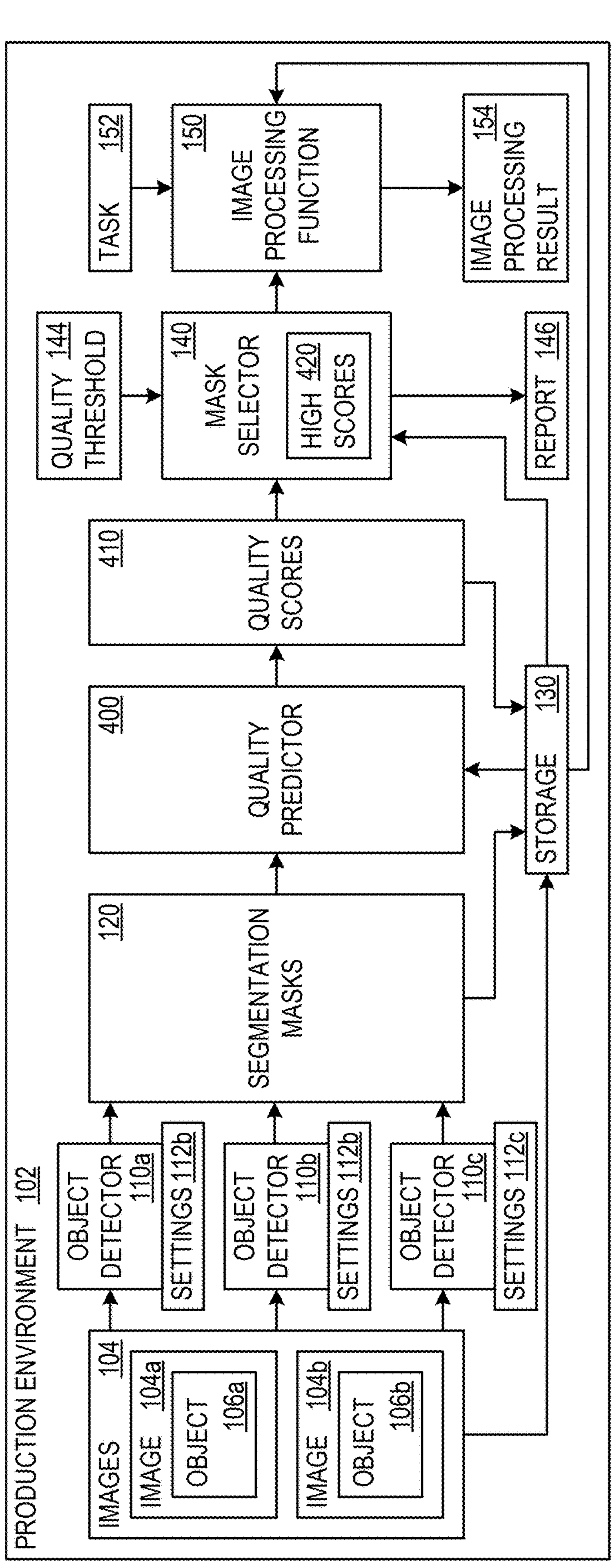
FIG. 1 illustrates an example architecture that advantageously performs runtime ranking of object detection.

FIG. 1 illustrates an example architecture 100 that advantageously performs runtime ranking of object detection performance (e.g., generation of segmentation masks) in a production environment 102, in order to enhance performance of downstream computer vision or image processing tasks. Salient object detection (SOD) is performed on a set of images, for example images 104 (a plurality of images), to produce a set of segmentation masks 120. In some examples, images 104 includes at least some of the DUTS large-scale saliency detection dataset (named after the organization that originally produced it), which contains more than 10,000 training images and more than 5,000 test images.

Plurality of images 104 includes a first image 104*a* and a second image 104*b*, which are used in an example described herein. Image 104*a* shows at least one salient object, object 106*a*, although could show more than one salient object, and image 104*b* similarly shows at least one object 106*b*. A set of three object detectors, object detectors 110*a*-110*c*, is used to produce segmentation masks 120. In some examples, a different number of object detectors is used. In some examples, the number of segmentation masks in segmentation masks 120 may number in the thousands or more, rendering an attempt to perform a consistent human assessment of segmentation mask quality futile.

In some examples, one or more of object detectors 110*a*-110*c* has no user-definable settings, although a described example herein includes the more general case in which each of object detectors 110*a*-110*c* has user-definable operational settings. Example detectors includes U2Net ("U2-Net: Going Deeper with Nested U-Structure for Salient Object Detection"), DIS ("Highly Accurate Dichotomous Image Segmentation") and SelfReformer ("Towards Complete and Detail-Preserved Salient Object Detection")

Object detector 110*a* uses operational settings 112*a*, which can affect the performance of object detector 110*a* on images having different characteristics, such as sharpness, contrast, brightness, noise, object count, object characteristics, and others. For example some settings may improve performance of object detector 110*a* on images having significant blur, but at the cost of performance on images that have sharper edges, while different settings may reverse the performance effects. Object detector 110*b* uses operational settings 112*b*, and object detector 110*c* uses operational settings 112*c*. In some examples, due to the wide range of performance changes due to operational settings, two or more of object detectors 110*a*-110*c* may use a common object detection application (e.g., the same software package), but use different operational settings.

Figure 3:
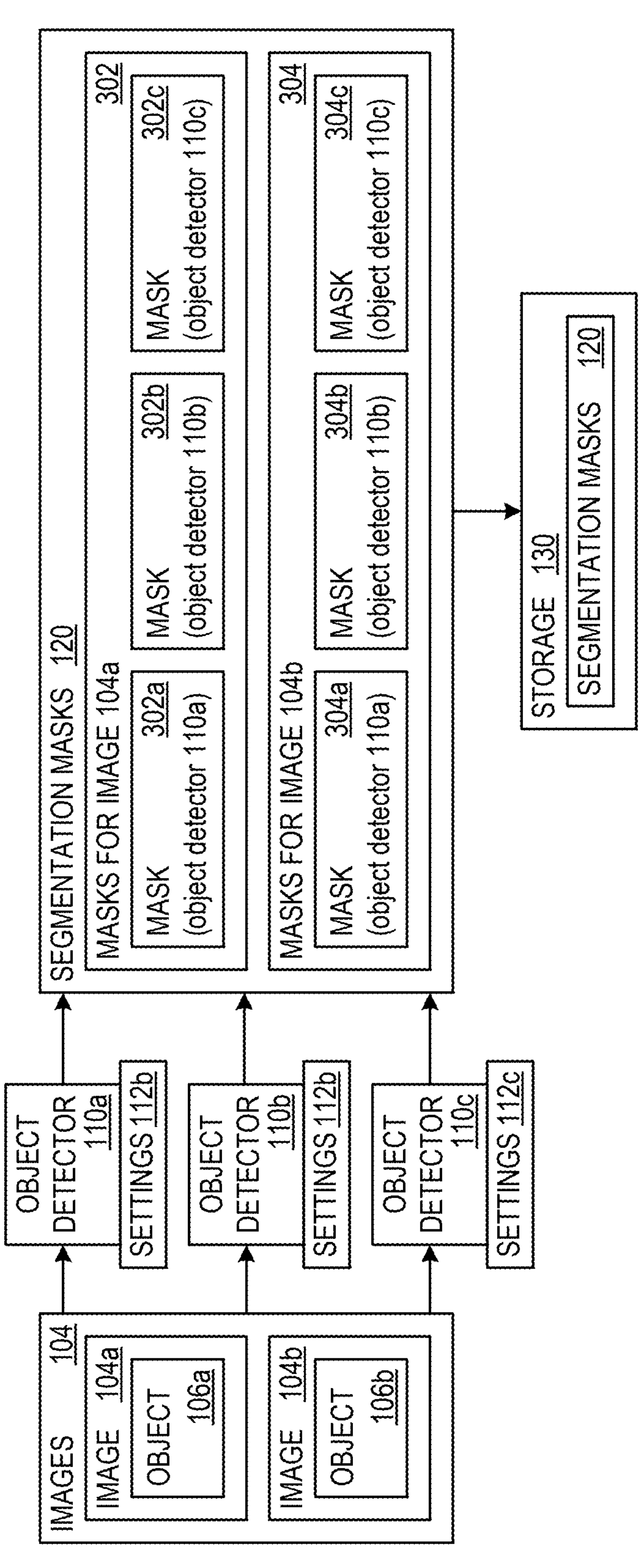
FIG. 3 illustrates further detail for generation of quality scores for segmentation masks, using an example of the architecture of FIG. 1.

The combination of two images 104*a* and 104*b* and three object detectors 110*a*-110*c* gives six segmentation masks in segmentation masks 120, which are shown in FIG. 3. Some examples may have a different number of segmentation masks. A quality predictor 400 assigns a quality score to each segmentation mask of segmentation masks 120. In this described example of six segmentation mask, there are six quality scores, indicated as a set in quality scores 410, and shown individually (grouper per each image) in FIG. 4, grouped per each image (e.g., grouped according to images 104*a* and 104*b*).

Figure 4:
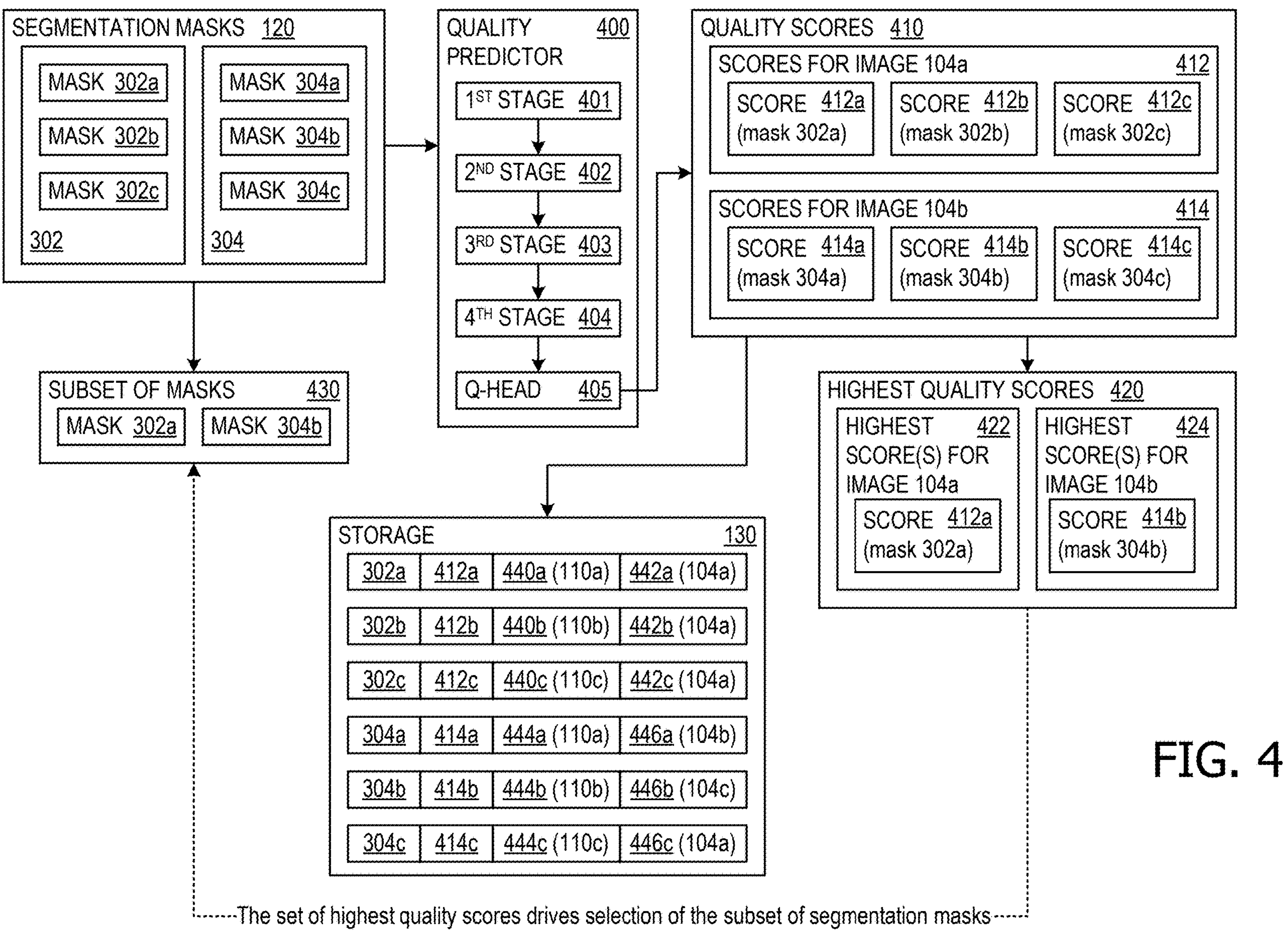
FIG. 4 illustrates further detail for assignment of quality scores, using an example of the architecture of FIG. 1.

In some examples, images 104, segmentation masks 120, and quality scores 410 are persisted (stored) in a storage 130, which may be any type of computer-readable storage. As used herein, persisting means that data outlives the process that creates it, meaning that segmentation masks 120 and quality scores 410 remain within storage 130 even after the process of generating segmentation masks 120 and quality scores 410 concludes (e.g., after any software, that may have been used to create and output segmentation masks 120 and quality scores 410, has terminated execution. In some examples, quality predictor 400 retrieves segmentation masks 120 from storage 130, whereas in some examples, quality predictor 400 receives segmentation masks 120 from object detectors 110*a*-110*c* without needing to retrieve segmentation masks 120 from storage 130. An example arrangement of persisting segmentation masks 120 and quality scores 410 in storage 130 is shown in FIG. 4.

A mask selector 140 determines a set of highest quality scores 420 from among quality scores 410, and selects the segmentation mask(s) from segmentation masks 120 to use by an image processing function 150 in the performance of an image processing task 152 that produces an image processing result 154. In some examples, mask selector 140 retrieves quality scores 410 from storage 130, whereas in some examples, mask selector 140 receives quality scores 410 from quality predictor 400 without needing to retrieve quality scores 410 from storage 130.

Image processing function 150 provides the computational capability to perform image processing task 152 on images 104*a* and 104*b*, and outputs image processing result 154 (e.g., an altered image, a trained object detector, or another output product). Examples of image processing task 152 include training other object detectors, automatically editing images (e.g., replacing backgrounds "behind" an object or objects), and separating images into various regions to assist a human with editing an image. Another example tasks is an artificial intelligence (AI) cursor, where AI model can automatically analyze the salient objects within one image and allow the user to select the objects easily (e.g., simply hover the cursor over an object) to analyze the object's attributes and search for images of similar objects on the internet.

Because the quality of image processing result 154 may depend on the quality of the input data, including segmentation masks, in some examples, a user is able to specify a quality threshold 144. In some examples, quality threshold 144 may be used to filter segmentation masks, so that only segmentation masks having an assigned quality score meeting quality threshold 144 are used in image processing task 152. In such examples, set of highest quality scores 420 includes all quality scores within quality scores 410 that meet quality threshold 144. In such examples, there may be no segmentation masks at all for an image (in which case image processing task 152 does not use that image), or there may be more than one segmentation mask for an image (in which case image processing task 152 may be performed using that image more than once).

In some examples, quality threshold 144 is not used, and only the highest-scoring segmentation mask (the segmentation mask associated with the highest quality score) is used in image processing task 152. In such examples, set of highest quality scores 420 includes one quality scores from quality scores 410 per image.

In some examples, mask selector 140 generates a report 146 indicating one or more quality score from among quality scores 410. This enables users to identify trends in the performance of object detectors 110*a*-110*c*, such as enabling identification of operational settings and/or object detection applications having generally superior performance that result in the generation of higher quality segmentation masks.

Figure 2:
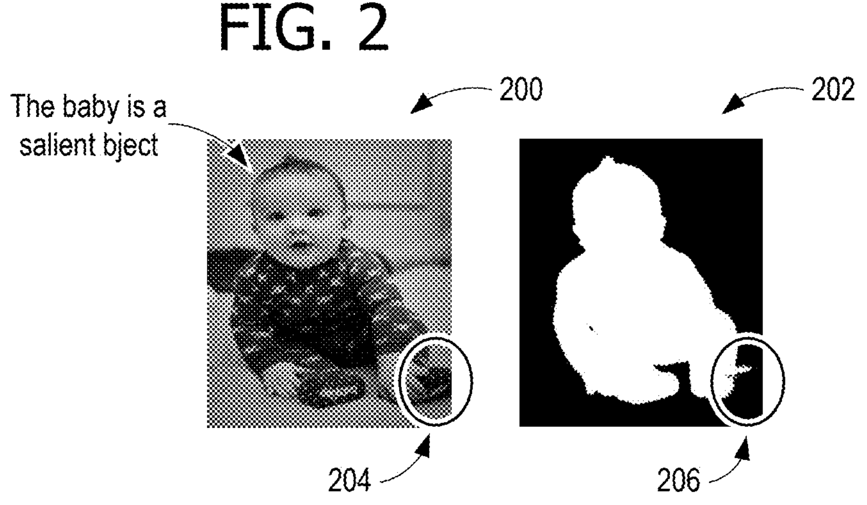
FIG. 2 illustrates an exemplary consideration for determining mask quality.

FIG. 2 illustrates a segmentation mask quality issue. An image 200 shows a baby human as a salient object and has an associated segmentation mask 202. Segmentation mask 202 has a notable error. A portion of the baby's foot, identified by an annotation 204 (i.e., an oval surrounding the baby's foot within image 200) is missing from segmentation mask 202, as identified by an annotation 206 (i.e., an oval surrounding the location where the baby's foot should have been detected and included within segmentation mask 202).

FIG. 3 illustrates further detail for generation of segmentation masks 120. Object detector 110*a* generates segmentation mask 302*a* for image 104*a* and segmentation mask 304*a* for image 104*b*. Object detector 110*b* generates segmentation mask 302*b* for image 104*a* and segmentation mask 304*b* for image 104*b*. Object detector 110*c* generates segmentation mask 302*c* for image 104*a* and segmentation mask 304*c* for image 104*b*. Segmentation masks 302*a*-304*c* are shown grouped per image.

A plurality of segmentation masks 302 is the set of segmentation masks for image 104*a*, from object detectors 110*a*-110*c*, and includes segmentation mask 302*a*, segmentation mask 302*b*, and segmentation mask 302*c*. A plurality of segmentation masks 304 is the set of segmentation masks for image 104*b*, from object detectors 110*a*-110*c*, and includes segmentation mask 304*a*, segmentation mask 304*b*, and segmentation mask 304*c*. In some examples, segmentation masks 120 are persisted in storage 130.

FIG. 4 illustrates further detail for generating quality scores 410. In some examples, quality predictor 400 comprises a multi-stage vision transformer model with a query head 405. In the illustrated example, four stages are shown, a stage 401 takes a segmentation mask (e.g., segmentation mask 302*a*) and an image (e.g., image 104*a*) as input, a stage 402 follows, then a stage 403, and then a stage 404. Some examples use a different number of stages, such as five. Query head 405 ("Q head") outputs the Q vector (of the common Q, K, V vectors of transformer architectures) using the output from stage 404. In some examples, each stage has multiple transformer blocks, further enhancing the semantics and representation power of intermediate features from the last stage. The final enhanced feature is provided to query head 405 to predict the final quality score.

When image 104*a* and segmentation mask 302*a* are provided to quality predictor 400, quality predictor 400 assigns a quality score 412*a* to segmentation mask 302*a*. When image 104*a* and segmentation mask 302*b* are provided to quality predictor 400, quality predictor 400 assigns a quality score 412*b* to segmentation mask 302*b*. When image 104*a* and segmentation mask 302*c* are provided to quality predictor 400, quality predictor 400 assigns a quality score 412*c* to segmentation mask 302*c*. When image 104*b* and segmentation mask 304*a* are provided to quality predictor 400, quality predictor 400 assigns a quality score 414*a* to segmentation mask 304*a*. When image 104*b* and segmentation mask 304*b* are provided to quality predictor 400, quality predictor 400 assigns a quality score 414*b* to segmentation mask 304*b*. When image 104*b* and segmentation mask 302*c* are provided to quality predictor 400, quality predictor 400 assigns a quality score 414*c* to segmentation mask 304*c*.

Similarly to segmentation masks 120, quality scores 410 are shown grouped per image. Quality scores 412 are the quality scores for image 104*a*, and includes quality score 412*a*, quality score 412*b*, and quality score 412*c*. Quality scores 424 are the quality scores for image 104*b*, and includes quality score 414*a*, quality score 414*b*, and quality score 414*c*.

Set of highest quality scores 420 is shown as including a highest quality score 422 for image 104*a* and a highest quality score 424 for image 104*b*. In the illustrated example, highest quality score 422 is only quality score 412*a*, which is for mask 302*a* and image 104*a*, and highest quality score 424 is only quality score 414*b*, which is for mask 304*b* and image 104*b*. In some examples, there may be none or more than one highest quality scores 422 for image 104*a*, and/or none or more than one highest quality scores 424 for image 104*b*. However, in some examples, there will be fewer of highest quality scores 422 than the number of quality scores within quality scores 412, and fewer of highest quality scores 424 than the number of quality scores within quality scores 414.

A subset 430 of segmentation masks 120 is shown as including segmentation mask 302*a* and segmentation mask 304*b*. Set of highest quality scores 420 drives selection of subset 430 of segmentation masks 120. Segmentation mask 302*a* is included within subset 430 of segmentation masks 120 because segmentation mask 302*a* is associated with quality score 412*a* and quality score 412*a* is within set of highest quality scores 420. Similarly, segmentation mask 304*b* is included within subset 430 of segmentation masks 120 because segmentation mask 304*b* is associated with quality score 414*b* and quality score 414*b* is within set of highest quality scores 420.

In some examples, quality scores 410 are persisted in storage 130. As illustrated, each segmentation mask is persisted associated with its corresponding quality score, an indication of the object detector that produced it, and an indication of the image from which it was generated. In this way, when a user (or automated process) retrieves any of images 104, its associated segmentation masks and the quality scores for each of those associated segmentation masks are readily identifiable.

For example, segmentation mask 302*a* is associated with quality score 412*a*, an indication 440*a* of object detector 110*a*, and an indication 442*a* of image 104*a*. Segmentation mask 302*b* is associated with quality score 412*b*, an indication 440*b* of object detector 110*b*, and an indication 442*b* of image 104*a*. Segmentation mask 302*c* is associated with quality score 412*c*, an indication 440*c* of object detector 110*c*, and an indication 442*c* of image 104*a*. Segmentation mask 304*a* is associated with quality score 414*a*, an indication 444*a* of object detector 110*a*, and an indication 446*a* of image 104*b*. Segmentation mask 304*b* is associated with quality score 414*b*, an indication 444*b* of object detector 110*b*, and an indication 446*b* of image 104*b*. Segmentation mask 304*c* is associated with quality score 414*c*, an indication 444*c* of object detector 110*c*, and an indication 446*c* of image 104*b*.

Figure 5:
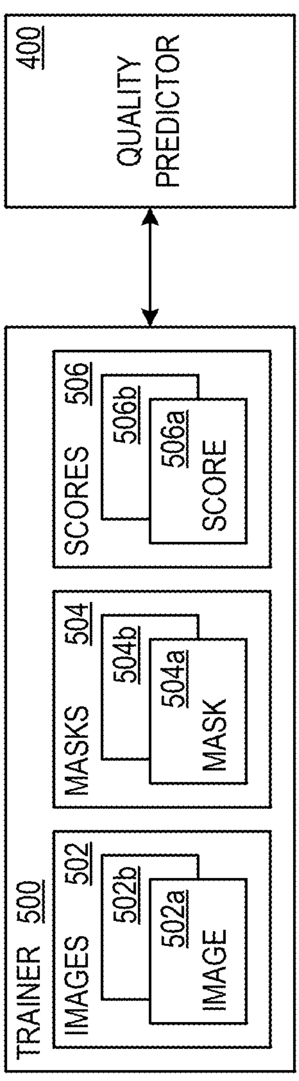
FIG. 5 illustrates training of an exemplary quality predictor used in the architecture of FIG. 1.

FIG. 5 illustrates training of quality predictor 400. A trainer 500 uses a plurality of training images 502, a plurality of segmentation masks 504, and a plurality of quality scored 506 to train quality predictor 400 to score segmentation masks without needing ground truth. In the case of object detection producing segmentation masks, ground truth is a segmentation mask that has been deemed to be the correct result for identifying an objects within an image. Each image of plurality of training images 502 has one or more associated segmentation masks within plurality of segmentation masks 504, and each segmentation mask within plurality of segmentation masks 504 has an associated quality score within plurality of quality scores 506. In some examples, quality predictor 400 is trained with the Mean Square Error (MSE) loss objective, aiming to align with the human annotated scores, using the Adam optimizer.

In some examples, at least some (up to all) of the quality scores within plurality of quality scores 506, is provided by a human assessments, in which the assessors are instructed to grade only the segmentation mask quality itself (e.g., complete for an object, well-defined edges), not whether the segmentation mask is for the "wrong" object, too many objects, or excluded an object. In this way, quality predictor 400 is trained to mimic human assessment of quality, independently of the number of objects to which a segmentation mask corresponds or omits. In some examples, a mean squared error (MSE) from the human-provided score (e.g., training ground truth) is used as the training loss function.

In some examples, the quality scores assigned by humans are integer values 1 to 4, with 1 representing a human's perception of lowest quality and 4 representing the human's perception of highest quality (e.g., near perfection). In some examples, quality scores 410 (output from quality predictor 400) are normalized to the interval [0, 1] with the set {1, 2, 3, 4} being mapped to {0.0, 0.33, 0.67, 1.0}.

FIG. 6 shows a flowchart 600 illustrating exemplary operations that may be performed by architecture 100. In some examples, operations described for flowchart 600 are performed by computing device 800 of FIG. 8. Flowchart 600 commences with receiving plurality of training images 502, plurality of segmentation masks 504 corresponding to plurality of training images 502, and plurality of quality scores 506 associated with each segmentation mask and training image, in operation 602. In operation 604, plurality of training images 502, plurality of segmentation masks 504, and plurality of quality scores 506 are used to train quality predictor 400 to assign quality scores to segmentation masks based on an input image, without needing ground truth for the input image.

Images 104 are received in operation 606, and operation 608 uses object detectors 110*a*-110*c* to generate segmentation masks 120 from images 104. Segmentation masks 120 comprises a plurality of segmentation masks that each correspond to an image of images 104. Operation 608 is performed using operations 610 and 612. Operation 610 generates segmentation mask 302*a* using object detector 110*a*, and operation 612 generates segmentation mask 302*b* using object detector 110*b* (and any other segmentation masks for image 104*a*). Operations 610 and 612 iterate until all segmentation masks have been generated for all desired combinations of images and object detectors.

Operation 614 persists at least some of segmentation masks 120, including segmentation mask 302*a*, possibly with indication 440*a* of object detector 110*a* and/or indication 442*a* of image 104*a*. Some examples also persist segmentation mask 302*b* (e.g., possibly with indications 440*b* and/or 442*b*). Examples that persist only the highest-scoring segmentation masks or segmentation masks meeting quality threshold 144 may not persist segmentation mask 302*b*, based on at least quality score 412*a* exceeding quality score 412*b* and/or quality score 412*b* not meeting quality threshold 144.

Quality predictor 400 receives segmentation masks 120 in operation 616, which is described using operations 618 and 620. In some examples this includes quality predictor 400 receiving segmentation masks 120 from object detectors 110*a*-110*c*, or retrieving segmentation masks 120 from storage 130. Segmentation mask 302*a*, corresponding to object 106*a* of image 104*a*, and which had been generated using object detector 110*a*, is received in operation 618. Segmentation mask 302*b*, also corresponding to object 106*a* of image 104*a*, but which had been generated using object detector 110*b* (a different object detector), is received in operation 620, along with any other segmentation masks for image 104*a*. Operations 618 and 620 iterate until all segmentation masks have been received for all desired combinations of images and object detectors.

In operation 622, quality predictor 400 assigns a quality score to each segmentation mask of segmentation masks 120 without using ground truth for any of the images. In some examples, assigning quality scores 410 and generating segmentation masks 120 is performed contemporaneously (e.g., during runtime of some production task in production environment 102). Operation 622 is described using operations 624 and 626. Quality predictor 400 assigns quality score 412*a* to segmentation mask 302*a* in operation 624, and in operation 626, quality predictor 400 assigns quality score 412*b* to segmentation mask 302*b* and other quality scores to segmentation masks associated with image 104*a* (e.g., quality score 412*c* to segmentation mask 302*c*). Operations 624 and 626 iterate until all segmentation masks have been assigned quality scores.

Quality predictor 400 generates report 146 in operation 628. In some examples, report 146 indicates all or most quality scores, including quality score 412*a* and quality score 412*b*. In some examples, report 146 is not generated until after operation 636 (described below) and/or indicates only set of highest quality scores 420. Quality scores 410 are persisted in operation 630. In some examples, quality scores are associated with their corresponding segmentation masks and/or images, such as quality score 412*a* is persisted associated with segmentation mask 302*a* and/or image 104*a* and quality score 412*b* is persisted associated with segmentation mask 302*b* and/or image 104*a*.

Mask selector 140 receives quality scores 410 in operation 632. In some examples mask selector 140 receives quality scores 410 directly from quality predictor, and in some examples, mask selector 140 retrieves quality scores 410 from storage 130. Quality threshold 144 is received in operation 634.

In operation 636, mask selector 140 selects subset 430 of segmentation masks 120 based on their corresponding quality scores. This includes operation 638, in which mask selector 140 determines set of highest quality scores 420 per each image of segmentation masks 120. For example, set of highest quality scores 420 includes less than (fewer than) all of quality scores 412 and 414 per each image. In an example described above, mask selector 140 selects segmentation mask 302*a* for image processing task 152 but does not select segmentation mask 302*b* for image processing task 152, based on at least quality score 412*a* exceeding quality score 412*b*. In some examples, selecting segmentation mask 302*a* for image processing task 152 comprises determining that quality score 412*a* meets quality threshold 144, and not selecting segmentation mask 302*b* for image processing task 152 comprises determining that quality score 412*b* does not meet quality threshold 144. In some examples, selecting segmentation mask 302*a* for image processing task 152 and not selecting segmentation mask 302*b* for image processing task 152 comprises determining that quality score 412*a* is the highest quality score for segmentation masks associated with image 104*a* (i.e., the highest of quality scores 412).

Image processing task 152 is performed in operation 640, using segmentation masks having an assigned quality score within set of highest quality scores 420 (e.g., using segmentation mask 302*a*). In some examples, set of highest quality scores 420 has only a single quality score per image, and may be only a single quality score, in some scenarios. In some examples, set of highest quality scores 420 comprises a plurality of quality scores, and may have a plurality of quality scores per image, in some scenarios. In some scenarios, there may be no segmentation masks for an image having a quality score within set of highest quality scores 420. To perform image processing task 152, image processing function 150 may retrieve images and/or segmentation masks (e.g., image 104*a* and/or segmentation mask 302*a*) from storage 130. In some examples, image processing function 150 may receive subset 430 of segmentation masks 120 and/or set of highest quality scores 420 from mask selector 140. In some examples, assigning quality scores 410 and performing image processing task 152 is performed contemporaneously (e.g., during runtime of some production task in production environment 102).

Figure 7A:
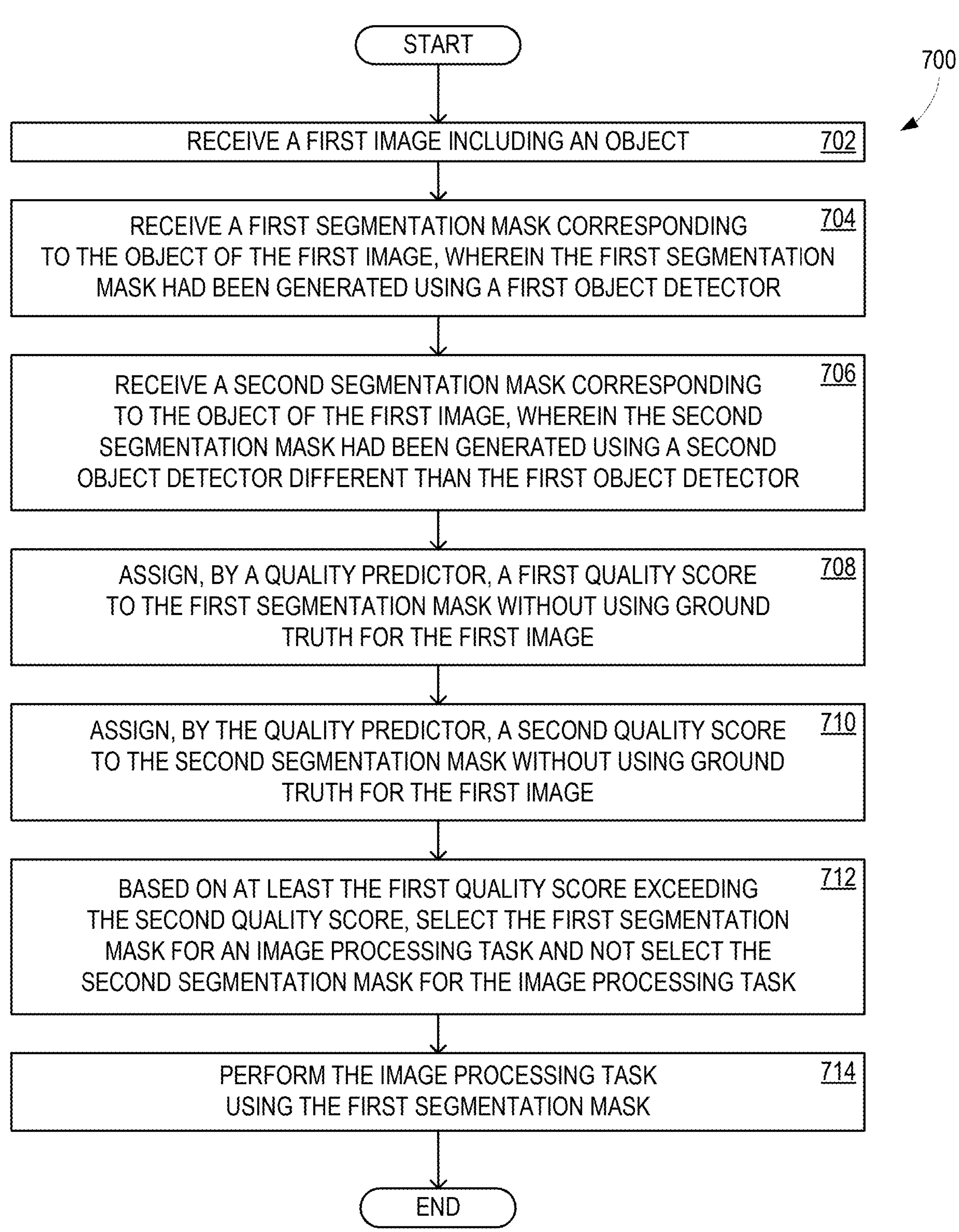

FIG. 7A shows a flowchart 700 illustrating exemplary operations that may be performed by architecture 100. In some examples, operations described for flowchart 700 are performed by computing device 800 of FIG. 8. Flowchart 700 commences with operation 702, which includes receiving a first image including an object. Operation 704 includes receiving a first segmentation mask corresponding to the object of the first image, wherein the first segmentation mask had been generated using a first object detector. Operation 706 includes receiving a second segmentation mask corresponding to the object of the first image, wherein the second segmentation mask had been generated using a second object detector different than the first object detector.

Operation 708 includes assigning, by a quality predictor, a first quality score to the first segmentation mask without using ground truth for the first image. Operation 710 includes assigning, by the quality predictor, a second quality score to the second segmentation mask without using ground truth for the first image. Operation 712 includes, based on at least the first quality score exceeding the second quality score, selecting the first segmentation mask for an image processing task and not selecting the second segmentation mask for the image processing task. Operation 714 includes, performing the image processing task using the first segmentation mask.

Figure 7B:
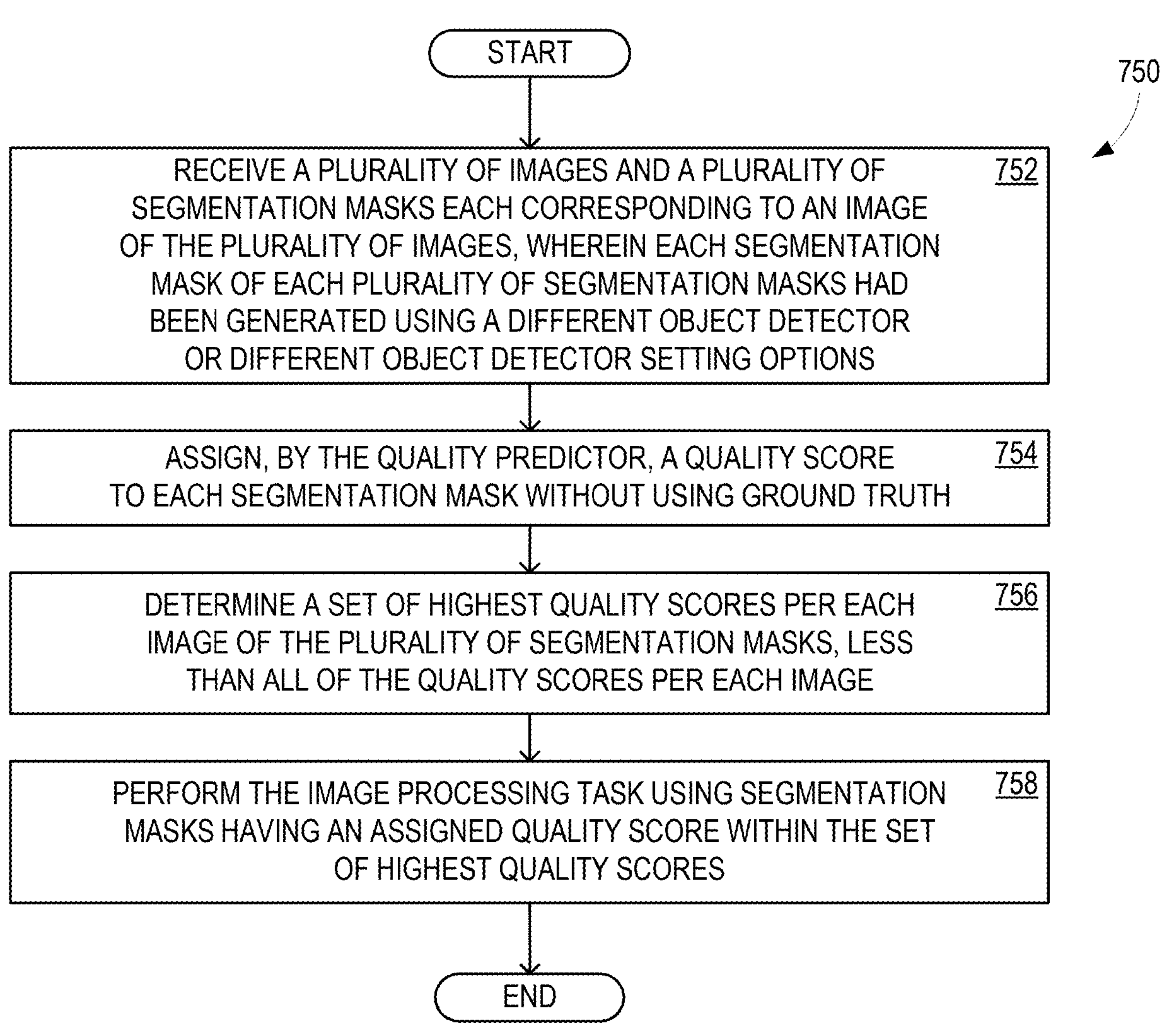

FIG. 7B shows a flowchart 750 illustrating exemplary operations that may be performed by architecture 100. In some examples, operations described for flowchart 750 are performed by computing device 800 of FIG. 8. Flowchart 750 commences with operation 752, which includes receiving a plurality of images and a plurality of segmentation masks each corresponding to an image of the plurality of images, wherein each segmentation mask of each plurality of segmentation masks had been generated using a different object detector or different object detector setting options.

Operation 754 includes assigning, by the quality predictor, a quality score to each segmentation mask without using ground truth. Operation 756 includes determining a set of highest quality scores per each image of the plurality of segmentation masks, less than all of the quality scores per each image. Operation 758 includes performing the image processing task using segmentation masks having an assigned quality score within the set of highest quality scores.

Additional Examples

An example system comprises: a processor; and a computer-readable medium storing instructions that are operative upon execution by the processor to: receive a first image including an object; receive a first segmentation mask corresponding to an object of the first image, wherein the first segmentation mask had been generated using a first object detector; receive a second segmentation mask corresponding to the object of the first image, wherein the second segmentation mask had been generated using a second object detector different than the first object detector; assign, by a quality predictor, a first quality score to the first segmentation mask without using ground truth for the first image; assign, by the quality predictor, a second quality score to the second segmentation mask without using ground truth for the first image; based on at least the first quality score exceeding the second quality score, select the first segmentation mask for an image processing task and not select the second segmentation mask for the image processing task; and perform the image processing task using the first segmentation mask.

An example computer-implemented method comprises: receiving a first image including an object; receiving a first segmentation mask corresponding to an object of the first image, wherein the first segmentation mask had been generated using a first object detector; receiving a second segmentation mask corresponding to the object of the first image, wherein the second segmentation mask had been generated using a second object detector different than the first object detector; assigning, by a quality predictor, a first quality score to the first segmentation mask without using ground truth for the first image; assigning, by the quality predictor, a second quality score to the second segmentation mask without using ground truth for the first image; based on at least the first quality score exceeding the second quality score, selecting the first segmentation mask for an image processing task and not selecting the second segmentation mask for the image processing task; and performing the image processing task using the first segmentation mask.

One or more example computer storage devices have computer-executable instructions stored thereon, which, on execution by a computer, cause the computer to perform operations comprising: receiving a plurality of images and a plurality of segmentation masks each corresponding to an image of the plurality of images, wherein each segmentation mask of each plurality of segmentation masks had been generated using a different object detector or different object detector setting options; assigning, by a quality predictor, a quality score to each segmentation mask without using ground truth; determining a set of highest quality scores per each image of the plurality of segmentation masks, less than all of the quality scores per each image; and performing an image processing task using segmentation masks having an assigned quality score within the set of highest quality scores.

Alternatively, or in addition to the other examples described herein, examples include any combination of the following:

- selecting the first segmentation mask for the image processing task comprises determining that the first quality score meets a quality threshold;

not selecting the second segmentation mask for the image processing task comprises determining that the second quality score does not meet the quality threshold;

assigning the first quality score and the second quality score is performed contemporaneously with performing the image processing task;

generating the first segmentation mask using the first object detector;

generating the second segmentation mask using the second object detector;

generating the first segmentation mask and the second segmentation mask is performed contemporaneously with assigning the first quality score and the second quality score;

receiving a plurality of training images, a plurality of segmentation masks corresponding to the plurality of training images, and a plurality of quality scores associated with each segmentation mask and training image;

using the plurality of training images, the plurality of segmentation masks, and the plurality of quality scores, training the quality predictor to assign quality scores to segmentation masks based on an input image, without needing ground truth for the input image;

the quality predictor comprises a multi-stage vision transformer model with a query head;

persisting the first segmentation mask;

persisting the first segmentation mask with an indication of the first object detector;

persisting the first quality score associated with the first segmentation mask;

persisting the first quality score associated with both the first image and the first segmentation mask;

persisting the first quality score associated with the first segmentation mask based on at least the first quality score exceeding the second quality score;

persisting the second segmentation mask;

persisting the second segmentation mask with an indication of the second object detector;

persisting the second quality score associated with the second segmentation mask;

persisting the second quality score associated with both the first image and the second segmentation mask;

not persisting the second segmentation mask based on at least the first quality score exceeding the second quality score;

generating a report indicating the first quality score and the second quality score;

receiving the quality threshold;

retrieving the first image, the first quality score, and the second quality score;

retrieving the first segmentation mask;

assigning the first quality score is performed and the second quality score and generating the first segmentation mask and the second segmentation mask is performed within a production environment;

the first object detector and the second object detector comprise a common object detection application using differing operational settings;

receiving a plurality of segmentation masks corresponding to the object of the first image, wherein each segmentation mask of the plurality of segmentation masks had been generated using a different object detector or different object detector setting options;

assigning, by the quality predictor, a quality score to each segmentation mask without using ground truth;

determining a set of highest quality scores per each image of the plurality of segmentation masks, less than all of the quality scores per each image;

performing the image processing task using segmentation masks having an assigned quality score within the set of highest quality scores;

the set of highest quality scores is a single quality score;

the set of highest quality scores comprises a plurality of quality scores;

assigning the quality scores is performed contemporaneously with performing the image processing task;

generating the plurality of segmentation masks; and generating the plurality of segmentation masks is performed contemporaneously with assigning the quality scores.

While the aspects of the disclosure have been described in terms of various examples with their associated operations, a person skilled in the art would appreciate that a combination of operations from any number of different examples is also within scope of the aspects of the disclosure.

Example Operating Environment

FIG. 8 is a block diagram of an example computing device 800 (e.g., a computer storage device) for implementing aspects disclosed herein, and is designated generally as computing device 800. In some examples, one or more computing devices 800 are provided for an on-premises computing solution. In some examples, one or more computing devices 800 are provided as a cloud computing solution. In some examples, a combination of on-premises and cloud computing solutions are used. Computing device 800 is but one example of a suitable computing environment and is not intended to suggest any limitation as to the scope of use or functionality of the examples disclosed herein, whether used singly or as part of a larger set.

Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer storage memory 812, one or more processors 814, one or more presentation components 816, input/output (I/O) ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more buses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer storage media referenced below and operatively provide storage of computer-readable instructions, data structures, program modules and other data for the computing device 800. In some examples, memory 812 stores one or more of an operating system, a universal application platform, or other program modules and program data. Memory 812 is thus able to store and access data **812*a* and instructions 812*b* that are executable by processor 814 and configured to carry out the various operations disclosed herein. Thus, computing device 800 comprises a computer storage device having computer-executable instructions 812*b*** stored thereon.

In some examples, memory 812 includes computer storage media. Memory 812 may include any quantity of memory associated with or accessible by the computing device 800. Memory 812 may be internal to the computing device 800 (as shown in FIG. 8), external to the computing device 800 (not shown), or both (not shown). Additionally, or alternatively, the memory 812 may be distributed across multiple computing devices 800, for example, in a virtualized environment in which instruction processing is carried out on multiple computing devices 800. For the purposes of this disclosure, "computer storage media," "computer storage memory," "memory," and "memory devices" are synonymous terms for the memory 812, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represents an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

Computing device 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 824 communicates over wireless communication link 826 and/or a wired communication link **826*a* to a remote resource 828 (e.g., a cloud resource) across network 830. Various different examples of communication links 826 and 826*a*** include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a computer-readable medium storing instructions that are operative upon execution by the processor to:

receive an image, the image including an object;

generate, using a first object detector having a first set of operational settings, a first segmentation mask corresponding to the object;

generate, using a second object detector, the second object detector different than the first object detector, the second object detector having a second set of operational settings different from the first set of operational settings, a second segmentation mask corresponding to the object;

cause a quality predictor to assign, a first quality score to the first segmentation mask, wherein the quality predictor comprises a multi-stage vision transformer model having multiple sequential transformer stages and a query head;

cause the quality predictor to assign, a second quality score to the second segmentation mask based on paired input of the image and the second segmentation mask, wherein the query head outputs a learned Q-vector representing predicted segmentation-mask quality, the quality predictor having been trained using human-provided segmentation-mask quality scores independent of object identity or object count;

based on at least the first quality score exceeding the second quality score and the first quality score exceeding a user-specified quality threshold, select the first segmentation mask for an image processing task; and perform the image processing task using the first segmentation mask.

2. The system of claim 1, wherein selecting the first segmentation mask for the image processing task comprises determining that the first quality score meets a quality threshold and wherein not selecting the second segmentation mask for the image processing task comprises determining that the second quality score does not meet the quality threshold.

3. The system of claim 1, wherein causing the quality predictor to assign the first quality score and causing the quality predictor to assign the second quality score are performed contemporaneously with performing the image processing task.

4. The system of claim 1, wherein the instructions are further operative to:

generate the first segmentation mask using the first object detector; and generate the second segmentation mask using the second object detector.

5. The system of claim 4, wherein generating the first segmentation mask and generating the second segmentation mask is-are performed contemporaneously with causing the quality predictor to assign the first quality score and causing the quality predictor to assign the second quality score.

6. The system of claim 1, wherein the instructions are further operative to:

receive a plurality of training images, a plurality of segmentation masks corresponding to the plurality of training images, and a plurality of quality scores associated with each segmentation mask and training image; and using the plurality of training images, the plurality of segmentation masks, and the plurality of quality scores, cause the quality predictor to assign quality scores to segmentation masks based on an input image, without needing ground truth for the input image.

7. A computer-implemented method comprising:

receiving an image, the image including an object;

generating, using a first object detector having a first set of operational settings, a first segmentation mask corresponding to the object;

generating, using a second object detector, the second object detector different than the first object detector, the second object detector having a second set of operational settings different from the first set of operational settings, a second segmentation mask corresponding to the object;

causing a quality predictor to assign a first quality score to the first segmentation mask wherein the quality predictor comprises a multi-stage vision transformer model having multiple sequential transformer stages and a query head;

causing the quality predictor to assign a second quality score to the second segmentation mask based on paired input of the image and the second segmentation mask, wherein the query head outputs a learned Q-vector representing predicted segmentation-mask quality, the quality predictor having been trained using human-provided segmentation-mask quality scores independent of object identity or object count;

based on at least the first quality score exceeding the second quality score and the first quality score exceeding a user-specified quality threshold, selecting the first segmentation mask for an image processing task; and performing the image processing task using the first segmentation mask.

8. The computer-implemented method of claim 7, wherein selecting the first segmentation mask for the image processing task comprises determining that the first quality score meets a quality threshold and wherein not selecting the second segmentation mask for the image processing task comprises determining that the second quality score does not meet the quality threshold.

9. The computer-implemented method of claim 7, wherein assigning the first quality score and the second quality score is performed contemporaneously with performing the image processing task.

10. The computer-implemented method of claim 7, further comprising:

generating the first segmentation mask using the first object detector; and generating the second segmentation mask using the second object detector.

11. The computer-implemented method of claim 10, wherein generating the first segmentation mask and the second segmentation mask is performed contemporaneously with assigning the first quality score and the second quality score.

12. The computer-implemented method of claim 7, further comprising:

receiving a plurality of training images, a plurality of segmentation masks corresponding to the plurality of training images, and a plurality of quality scores associated with each segmentation mask and training image; and using the plurality of training images, the plurality of segmentation masks, and the plurality of quality scores, causing the quality predictor to assign quality scores to segmentation masks based on an input image, without needing ground truth for the input image.

13. A computer storage device having computer-executable instructions stored thereon, which, on execution by a computer, cause the computer to perform operations comprising:

receiving an image, the image including an object;

generating, using a first object detector having a first set of operational settings, a first segmentation mask corresponding to the object;

generating, using a second object detector, the second object detector different than the first object detector, the second object detector having a second set of operational settings different from the first set of operational settings, a second segmentation mask corresponding to the object;

causing a quality predictor to assign a first quality score to the first segmentation mask, wherein the quality predictor comprises a multi-stage vision transformer model having multiple sequential transformer stages and a query head;

causing the quality predictor to assign a second quality score to the second segmentation mask based on paired input of the image and the second segmentation mask, wherein the query head outputs a learned Q-vector representing predicted segmentation-mask quality, the quality predictor having been trained using human-provided segmentation-mask quality scores independent of object identity or object count;

based on at least the first quality score exceeding the second quality score and the first quality score exceeding a user-specified quality threshold, selecting the first segmentation mask for an image processing task; and performing the image processing task using the first segmentation mask.

14. The computer storage device of claim 13, wherein is causing the quality predictor to assign the first quality score and causing the quality predictor to assign the second quality score are performed contemporaneously with performing the image processing task.

15. The computer storage device of claim 13, wherein the operations further comprise:

generating the first segmentation mask and generating the second segmentation mask contemporaneously with causing the quality predictor to assign the first quality score and the second quality score.

16. The computer storage device of claim 15, wherein the operations further comprise:

receiving a plurality of training images, a plurality of segmentation masks corresponding to the plurality of training images, and a plurality of quality scores associated with each segmentation mask and training image; and using the plurality of training images, the plurality of segmentation masks, and the plurality of quality scores, causing the quality predictor to assign quality scores to segmentation masks based on an input image, without needing ground truth for the input image.

17. The computer storage device of claim 13, wherein to select the first segmentation mask for the image processing task comprises determining that the first quality score meets a quality threshold and wherein to not select the second segmentation mask for the image processing task comprises determining that the second quality score does not meet the quality threshold.

18. The computer storage device of claim 13, wherein causing the quality predictor to assign the first quality score and causing the quality predictor to assign the second quality score are performed contemporaneously with performing the image processing task.

* * * * *